DE WITT C. MARKHAM.
HAND TRUCK.
APPLICATION FILED FEB. 18, 1907.

900,405.

Patented Oct. 6, 1908.

2 SHEETS—SHEET 1.

WITNESSES

INVENTOR

DE WITT C. MARKHAM.
HAND TRUCK.
APPLICATION FILED FEB. 18, 1907.

900,405.

Patented Oct. 6, 1908.

2 SHEETS—SHEET 2.

WITNESSES

INVENTOR
DeWitt C. Markham
BY Risley & Love
ATTORNEYS

UNITED STATES PATENT OFFICE.

DE WITT C. MARKHAM, OF PORT LEYDEN, NEW YORK.

HAND-TRUCK.

No. 900,405.  Specification of Letters Patent.  Patented Oct. 6, 1908.

Application filed February 18, 1907. Serial No. 357,786.

*To all whom it may concern:*

Be it known that I, DE WITT C. MARKHAM, a citizen of the United States, residing at Port Leyden, in the county of Lewis and State of New York, have invented certain new and useful Improvements in Hand-Trucks, of which the following is a specification, reference being had therein to the accompanying drawing.

My invention relates to an improved hand truck, and I declare that the following is a full, clear, concise and exact description thereof sufficient to enable one skilled in the art to make and use the same, reference being had to the accompanying drawings in which like letters and numerals refer to like parts throughout.

The device is shown in a form for use in the handling of milk cans. At present I know of no carriage or truck by which these cans can be carried, it being necessary to handle each one separately by rolling or lifting it. I have devised a truck whereby cans can be lifted on the rack of a truck, the rack being mounted so as to be swung to clear them from the ground, when they can be readily transported from place to place.

Figure 1:
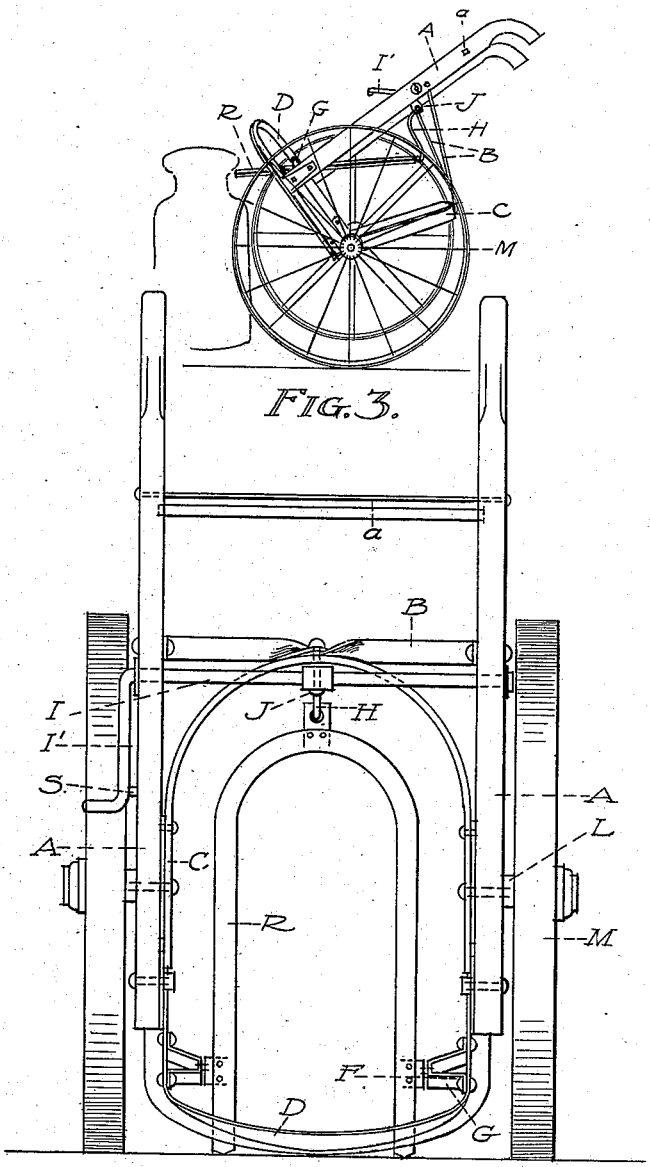
Figure 2:
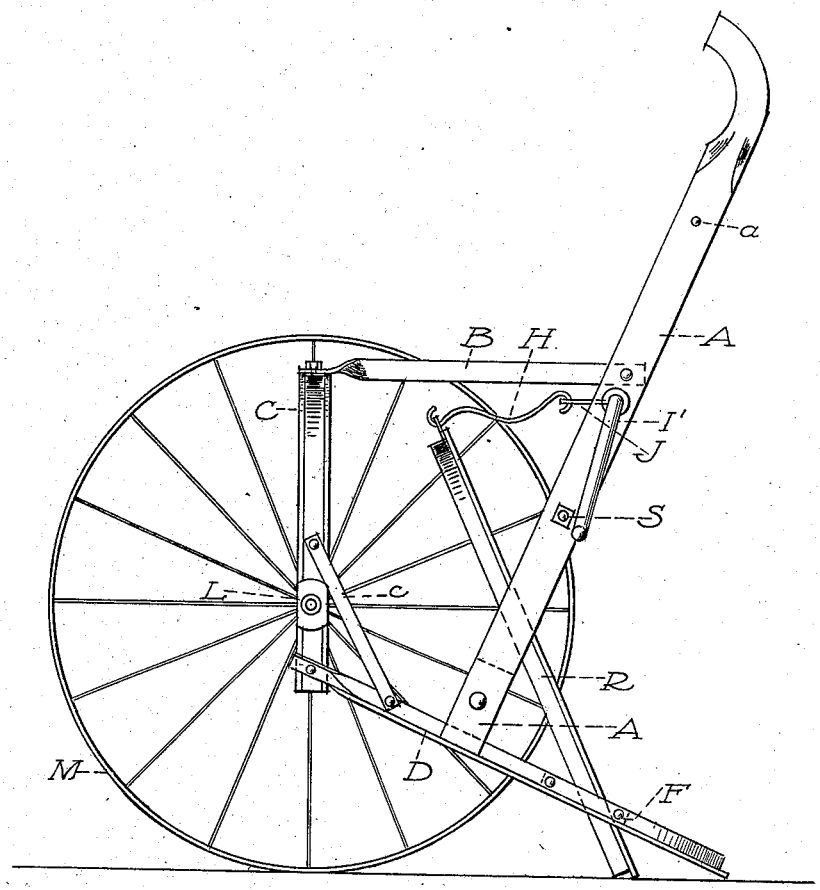

In the drawings Figure 1 is a front view of the truck in idle position as shown in Fig. 2 which is a side view, the near wheel being removed. Fig. 3 shows the truck in its operative position.

Referring to the figures in detail, the truck comprises a frame shown by the parts A, B, C and D and which frame is supported on the hubs L and the wheels M. The portion of the frame designated as A is extended to provide truck handles. At the other end it is fixedly connected with the member D. The member B of the rack forms a connection or brace between the head of the member C and the member A. Part C is formed U-shape with the head toward the handles, the brace member B being secured at the head and extending to each handle. The part D is also U-shape, inverted, the ends being fastened to the side portions of C. This construction provides a rail frame, resisting all spreading pressure. Suitable braces, as indicated by $c$, may be employed to strengthen the frame. The rack of the truck consists of an iron frame, bent in U-form. It is pivotally supported on the frame by means of the brackets G which fixes the proper space between its sides, pins or bolts F holding it to the bracket. At the other end of the rack is a link H, one end of which engages the rack and the other end of which engages a lever I at a stud or bar J thereon, the lever having a handle I'. The link is so formed and the stud is so positioned that the operation of the lever I carries that end of the link over the center, so as to lock the rack in upper position when the lever is turned. A stud, $s$, may be employed to strengthen the frame. its lowered position. It will be seen, as indicated in Fig. 3 particularly, that the truck is wheeled up to the cans, the handles being raised so as to put the rack practically level and the side bars of the rack are passed one on each side of the cans below the flare at the top. The handles of the truck are then depressed which raises the open end; the lever handle is also turned which by means of the link, lifts the closed end, so that by this combined operation this rack is lifted to a higher level and the cans are raised from the ground.

It will be seen that by means of the truck handles and the crank the rack is raised to lift the load clear of the ground and also that the load may be balanced on the wheels or distributed, so as to relieve the operator of the labor of holding the load lifted from the ground.

Various modifications can be made in detail of construction without departing from the spirit of the invention.

Having described my invention, what I claim as new and desire to secure by Letters Patent, is:

1. In a truck having an axle with wheels and a rigid frame on the axle adapted to be tilted therewith, a load-rack pivotally mounted on the frame at the end of the rack which receives the load and having at its other end a link connection with the corresponding end of the frame whereby to raise the rack vertically by tilting the frame and the operation of the link connection, substantially as described.

2. A truck provided with an axle and wheels, a tilting frame mounted intermediate of its ends on the axle and having forwardly extending side arms, and a rack pivotally supported at one end on said arms to take a load by tilting the arms of the frame downwardly, the rack having at the other end link connection with the end of the frame whereby to lift said end of the rack, substantially as described.

3. A truck comprising a frame mounted about midway of its ends on the axle and extending forwardly in an open end to engage the load, and a rack pivotally mounted at one end on the frame adjacent the forward end of the latter and at the rear end supported on the frame by a link and lever whereby to raise the rack at the end opposite that which receives the load, substantially as described.

4. A truck having a frame and a rack, the two being pivoted to each other at corresponding ends to receive and lift a load at that end by the tilting of the frame and rack downward, and at the other end having lever connections to raise that end of the rack to substantially horizontal position, substantially as described.

5. In a truck, an axle with a frame mounted to swing therewith, and a rack with bearings on the frame on each side of its mounting on the axle and at a substantial distance therefrom, one of said bearings comprising a link wherewith by tilting of the frame and the manipulation of the link member the rack is raised vertically relative to the axle, the link member being curved to pass its end across its line of lift whereby to lock the rack in elevated position, substantially as described.

6. In a truck, a tilting frame, a rack pivotally connected near one of its ends to the frame on one side of the truck axle and on the other side having lever connections therewith adapted at one end to receive and lift a load by the tilting of the frame at one end and by swinging the lever at the other end, substantially as described.

7. In a truck, a tilting frame and a rack pivoted adjacent one end thereto for passing such end under a load and having at the other end lever connection with the frame whereby to lift the load by tilting the frame and to tilt the plane of the rack.

8. A truck having a rigid four-sided frame on each side thereof, the frames being rigidly connected and mounted on the axle to swing therewith, one pair of said side parts being extended forwardly in projecting arms and another pair being oppositely extended in handles, a rack pivotally supported near one end on the said arms and at the other end supported on the frame by link and lever connections whereby to be raised or lowered, substantially as described.

9. A truck having two side portions rigidly connected and extending forward in an open end and mounted on the axle of the truck to swing therewith, and a rack pivotally supported on the frame at its open end at a distance on one side of the axle, and at a distance on the other side of the axle having link and lever connections with the other end of the frame whereby to raise or lower said rack relative to the frame, substantially as described.

10. A truck having a rigid four-sided frame on each side thereof, the frames being rigidly connected and mounted on the axle to swing therewith, one pair of said side parts being extended forwardly in projecting arms and another pair being oppositely extended in handles, a rack pivotally supported on the frame by link and lever connections whereby to be raised or lowered, the said link being curved to pass its free end over the line of lift and form locking means for holding the rack in its raised position, substantially as described.

11. A truck having wheels, an axle and a tilting frame mounted intermediate its ends on the axle to swing therewith, one pair of frame members being extended beyond the frame, and a rack pivoted at one end on the extended members and on the other end swingably connected with the frame at the other end thereof, substantially as described.

12. A truck having two side portions rigidly connected and extending forward in an open end and mounted on the axle of the truck to swing therewith, and a rack pivotally supported on the frame at its open end at a distance on one side of the axle, and at a distance on the other side of the axle having link connection with the other end of the frame and lever means to raise or lower said rack relative to the frame, substantially as described.

In testimony whereof I affix my signature in presence of two witnesses.

DE WITT C. MARKHAM.

Witnesses:
F. D. MARKHAM,
H. F. MARKHAM.